United States Patent [19]

Chakrabarti

[11] Patent Number: 5,258,468

[45] Date of Patent: Nov. 2, 1993

[54] PERMANENTLY ANTISTATIC POLYACRYLATE ARTICLES AND PROCESS FOR MAKING THEM

[76] Inventor: Raj Chakrabarti, 1361 Redfern Dr., Upper St. Clair, Pa. 15241

[21] Appl. No.: 685,743

[22] Filed: Apr. 16, 1991

[51] Int. Cl.$^5$ ................................. C08F 8/32
[52] U.S. Cl. ................. 525/380; 525/328.2; 525/328.9; 525/329.2; 525/330.5; 525/366
[58] Field of Search ................... 525/380, 366

[56] References Cited

U.S. PATENT DOCUMENTS

| | | | |
|---|---|---|---|
| 2,592,523 | 9/1952 | Ayers et al. | 525/380 |
| 3,182,047 | 5/1965 | Wehrmeister et al. | 525/380 |
| 3,585,172 | 6/1971 | Nishiyama et al. | 525/380 |
| 3,651,028 | 3/1972 | Maemoto et al. | 525/380 |

*Primary Examiner*—Bernard Lipman

[57] ABSTRACT

Permanently antistatic polyacrylate resin articles, antistatic polyacrylate resin compositions, and process for making them are described. The antistatic articles and compositions are obtained by reacting pendant ester groups on the surface of polyacrylate resin articles or on the chains of the polyacrylate resin compositions with dialkanolamines. The dialkanolamines used are typically dialkanolamines with lower alkanol groups, i.e. groups containing 1 to 4 carbon atoms. A preferred polyacrylate resin composition is poly(methyl methacrylate). A preferred alkanolamine is diethanolamine.

6 Claims, No Drawings

PERMANENTLY ANTISTATIC POLYACRYLATE ARTICLES AND PROCESS FOR MAKING THEM

BRIEF SUMMARY OF THE INVENTION

Permanently antistatic polyacrylate resin articles, antistatic polyacrylate resin compositions, and process for making them are described. The antistatic articles and compositions are obtained by reacting pendant ester groups on the surface of polyacrylate resin articles or on the chains of the polyacrylate resin compositions with dialkanolamines. The dialkanolamines used are typically dialkanolamines with lower alkanol groups, i.e. groups containing 1 to 4 carbon atoms. A preferred polyacrylate resin composition is poly(methyl methacrylate). A preferred alkanolamine is diethanolamine.

BACKGROUND OF INVENTION

Polyacrylates, made by homopolymerizing acrylic and substituted acrylic ester monomers, are versatile resins. Of particular importance among them is poly(methyl methacrylate) made by free-radical polymerization of methyl methacrylate monomer as shown below.

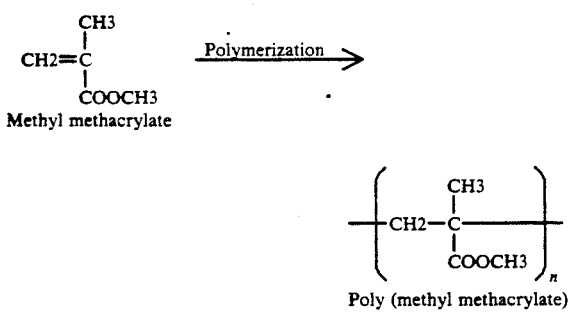

Poly(methyl methacrylate) is used to make the so-called "organic glass" tradenamed Plexiglas ® plastic by the Rohm & Haas Company. It is a hard and fairly rigid material which can be sawed, carved, or worked on a lathe. When heated above its glass transition temperature, poly(methyl methacrylate) is a tough, pliable, and extensible material that is easily bent or formed into complex shapes that can be molded or extruded. It finds many applications in which its shatter-resistance, high optical clarity, and workability make it preferred over glass. Among its important applications are airplane windows, electronic displays, safety shields, signs, see-through cabinet doors, automotive taillights, complex camera lenses, magnifiers, and reducers.

Though poly(methyl methacrylate) is probably the most prominent member of the acrylate polymers, other acrylates also find a wide range of commercial applications such as in coatings, adhesives, textile and paper sizes, etc. The choice of the polymer composition depends upon the intended use. Thus acrylic esters of higher alcohols impart softness or rubbery character, and the alpha-methyl group in methyl methacrylate imparts stability, hardness, and stiffness to the resultant polymers. Copolymers of acrylic esters with other ethylenically unsaturated monomers such as styrene, acrylonitrile, and vinyl acetate can also be made and they offer interesting properties and applications.

Versatility not withstanding, the polyacrylate resins suffer from one major disadvantage—they are very much prone to develop static when rubbed against other materials including air. Though static accumulation is by no means an unique property of polyacrylates, because all plastics by virtue of their insulative properties by and large are susceptible to static buildup, the polyacrylates are among those that are most susceptible. Thus the surface resistivity of poly(methyl methacrylate) is $1 \times 10^{17}$ to $2 \times 10^{18}$ ohms/square which is higher than that of other plastics which typically lie in the $5 \times 10^{13}$ to $1 \times 10^{15}$ ohms/square range.

Static presents many problems to plastics. Among them are dust attraction, electrical shock, fire hazard through spark generation, etc. Dust attraction by static in plastic is a major nuisance, but more than that, when one tries to wipe off this tenaciously adhering powder by buffing, it acts as an abrasive and scratches the surface of the plastic. Thus, one may start with a perfectly transparent Plexiglas ® plastic object but with use, soon end up with one that is haxy and opaque.

The recognition of the nuisance and other problems associated with static in plastic is not new and various approaches for controlling static buildup have been described in the literature. The most important of these approaches consists of treating the outer surface of the plastic with an antistatic compound, called an antistat in short. The Modern Plastics Encyclopedia lists 170 commercial antistatic additives. Another approach involves adding conductive pigments such as carbon black or metal fibers to the bulk of the plastic.

The second approach is often undesirable and is particularly so with polyacrylates such as Plexiglas ® plastic since it reduces transparency, aesthetic appeal, and deteriorates physical properties of the plastic. This approach is also undesirable because it increases bulk conductivity and as such minimizes one of the major attributes of plastic over metal, namely its insulative property.

The major problem with the use of topical antistats, on the other hand, is that the treatments are nondurable and the antistatic protection is lost in the course of normal use of the article or when the articles are washed.

In certain instances the antistats are directly incorporated into the bulk of the polymer to impart permanent antistatic properties. An example is the use of lauryl diethanolamide, the structure of which is shown below,

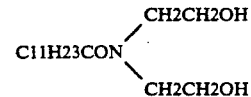

as an internal antistat in polyethylene film used for electronid packaging.

Internal antistats are used in relatively large concentrations and they work by gradual migration to the surface to form a thin equilibrium layer on the surface of the article, due to their inherent incompatibility with the resin. Even though internal antistats are used to provide permanent protection against static, they do not always work reliably or as desired. For instance, when polyethylene films containing lauryl diethanolamide are washed with water, the antistatic protection is lost and does not reappear for a long time presumably due to the loss of the surface layer via washing and the relatively slow rate of migration that helps to form a new layer.

Still another problem with internal antistats is that they act as plasticizers and as such deteriorate the physical properties of the plastic. Thus, with plastics like poly(methyl methacrylate) with relatively low glass transition temperatures (110°-115° C.), further decrease in softening temperature through plasticization is particularly undesirable.

When optical clarity is of prime value, as is in the case of Plexiglas ® poly(methyl methacrylate) plastic, the use of internal antistats is additionally undesirable because they reduce such clarity.

THE INVENTION

The present invention provides a process for rendering polyacrylate resin articles permanently static-free. More importantly, the permanent protection from static is achieved without sacrificing any of the bulk properties of the resin article.

The resin compositions that are used in making the antistatic polyacrylate resin articles of this invention are polymers of acrylic or substituted acrylic esters or their copolymers with other ethylenically unsaturated monomers and are represented by the following formula:

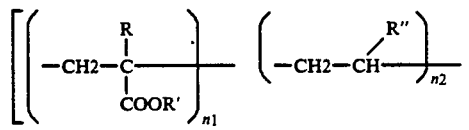

wherein R is either hydrogen or an alkyl group containing from 1 to 2 carbon atoms; R' is an alkyl group containing from 1 to 4 carbon atoms; R" is phenyl, cyano, or acetoxy group; $n_1+n_2=1$ wherein $n_1$ has a value ranging from about 0.2 to 1 to $n_2$ has a value ranging from 0 to 0.8; and where x is an integer ranging from about 100 to about 10,000,000.

As can be seen from the above description, the resins that are useful for this invention derive at least 20% of their chemical composition from an acrylic or substituted acrylic ester of the following formula:

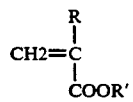

where R and R' are as described above.

A preferred resin composition is poly(methyl methacrylate).

The polyacrylate resin articles contemplated in this invention can be a powder, pellets, or preformed objects made from the resin by rolling, molding, extrusion, cutting or other operations common to thermoplastic processing. An example of a preferred object is a commercial grade Plexiglas ® plastic sheet of 0.16 to 15 cm thickness (Plexiglas is a registered tradename of the Rohm & Haas Company for poly(methyl methacrylate) sheets); an example of a preferred powder is commercial-grade poly(methyl methacrylate) granulated powder; and an example of preferred pellets are the commercial-grade 3.2 mm molding pellets of poly(methyl methacrylate). It is to be understood, however, that objects of other configuration, powders that are finer or coarser, and pellets of other sizes and of other polyacrylate resin compositions described herein before can also be used.

According to the present invention, the polyacrylate resin articles of the above description are rendered permanently static-free by reacting them on the surface with dialkanolamines represented by the following formula:

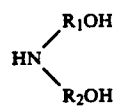

wherein $R_1OH$ and $R_2OH$ are alkanol groups containing from 1 to 4 carbon atoms.

The most preferred alkanolamine is diethanolamine which has the following formula:

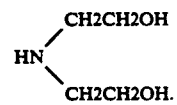

Another preferred dialkanolamine is diisopropanolamine and it has the following formula:

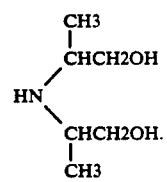

According to the present invention, the polyacrylate resin article and the dialkanolamine are reacted in the presence of excess of the dialkanolamine to provide adequate reaction on the surface of the article. Since the resin is not soluble in the dialkanolamine, very little reaction, if any, is believed to take place inside the bulk of the resin article. It is believed that the dialkanolamine reacts with some or all of the ester groups protruding out of those segments of polymer chains that are exposed to the surface of the article, resulting in its permanent modification. This is shown schematically as follows:

Schematic Representation

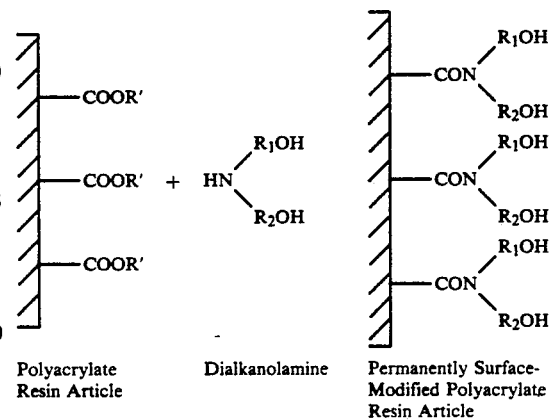

Polyacrylate Resin Article    Dialkanolamine    Permanently Surface-Modified Polyacrylate Resin Article wherein R', $R_1$ and $R_2$ are as described before.

It is not clearly understood why the surface modified polyacrylate resin composition does not hold static electricity. It is being speculated here that the alkanol groups hold a thin layer of water through hydrogen bonding and this conductive layer dissipates static charge as soon as it is developed as shown by the following schematic.

Schematic Representation of Static-Dissipating Surface of Present Invention

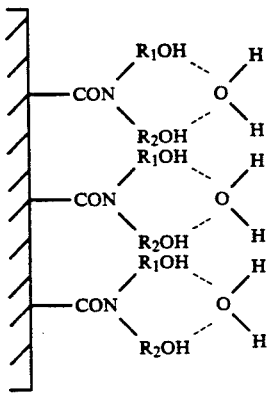

Since the reaction otherwise tends to proceed only slowly, it is often conducted in the presence of a catalytic amount of a basic catalyst such as alkali metal alkoxide which increases the reaction rate. Ordinarily, the alkali metal alkoxide contains from 1 to about 4 carbon atoms. Frequently the alkali metal alkoxide contains from 1 to about carbon atoms. Preferably the alkali metal alkoxide is alkali metal methoxide. The alkali metal alkoxide is frequently sodium alkoxide or potassium alkoxide. Sodium alkoxide is preferred. The particularly preferred alkali metal alkoxide is sodium methoxide. Other basic catalysts may be used when desired.

The ratio of the weight of the basic catalyst introduced to the weight of the dialkanolamine is ordinarily in the range of from about 0.0001 to about 0.05, although greater ratios may be used when desired. Frequently the ratio is in the range of from about 0.0005 to 0.001.

The reaction is obviously a heterogeneous reaction in which the insoluble resin article is either stirred or soaked in the liquid phase or exposed to the vapor phase of the dialkanolamine.

The reaction is frequently conducted at temperatures in the range of from about 70° C. to about 180° C., although greater or lesser temperatures may be used when desired. Often the reaction temperature is in the range of from about 80° to about 150° C. In many cases, the reaction temperature is in the range of from about 80° C. to about 120° C. From about 80° C. to about 105° C. is preferred.

The pressure under which the reaction is conducted may vary widely. The pressure may be below, at, or above ambient atmospheric pressure. In most cases, the reaction is conducted at about ambient atmospheric pressure.

The reaction may be conducted continuously, semi-continuously, batchwise, or semi-batchwise as desired.

Usually the reaction is a neat reaction, although substantially inert solvent may be used if desired.

In most cases, the reaction is conducted under substantially anhydrous conditions.

The surface-modified polyacrylate resin articles provided by this invention have permanent antistatic properties and find many uses. They are particularly useful for applications where static is undesirable, as is the case with most applications of such resins. The articles of this invention, when they are resin powders, for instance, can be handled with less annoyance and hazard in subsequent manufacturing steps than their static-prone counterparts. When these articles are preformed articles, they become less prone to dust pickup and, being substantially free from dust-related damage, provide longer useful life. Airplane windows, automotive taillights, etc. made from static-free surface-modified poly(methyl methacrylate) compositions of this invention retain their transparency longer since one major cause of loss of transparency in these cases is known to be dust-induced abrasive damage.

The invention is further described in conjunction with the following examples which are considered to be illustrative rather than limiting.

EXAMPLES 1-5

Preparation of Permanently Static-Free Poly(methyl methacrylate) Sheets

First, an intimate mixture of diethanolamine and sodium methoxide catalyst was made as follows.

250 g of diethanolamine was weighed into a three-necked flask fitted with a thermometer, a mechanical stirrer, and a drying tube. A solution of 0.25 g of sodium methoxide in 10 ml of anhydrous methanol was then added to the flask. The flask was heated in a heating mantle with stirring and the temperature was allowed to rise slowly to 100° C. As the temperature increased, methanol escaped through the drying tube into the atmosphere. When no more methanol was escaping (approximately 30 min. at 100° C.), the mixture was cooled to room temperature and stored in a sealed bottle.

To carry out the reaction, two 4"×4" Plexiglas ® poly(methyl methacrylate) plates cut from 2.5 mm thick sheets were dipped in 75 g of diethanolamine containing the sodium methoxide catalyst in a 6" diameter petri dish, which was placed on a 12"×12" glass plate. This petri dish was then covered with a larger petri dish and the edge of the cover dish on the glass plate was sealed with silicone calking to ensure that no moisture could leak into the reaction chamber. The entire assembly was then heated in an oven set at a desired temperature.

After the appropriate reaction time, the assembly was opened and the three plexiglas test plates removed from under the diethanolamine, washed first with cold, running tap water and then with distilled water. They were then wipe-dried with Kleenex ® tissues, conditioned for at least 124 hours in the 15% relative humidity chamber, and tested for static buildup behavior. The reaction was repeated on separate plates at different temperatures for different periods of time.

In all, three sets of this reaction were carried out—one at room temperature for 48 hours, one at 80° C. for 6 hours, and one at 100° C. for 10 hours. These constitute examples 3 through 5. Examples 1 and 2 are untreated controls—example 1 representing a Plexiglas ® plastic as received and example 2 is the same except that the sample was thoroughly washed with water before drying. Both control samples were also conditioned at 15% relative humidity for at least 24 hours before testing for static.

Measurement of Static

The propensity for static buildup in the test plates was measured by using a modification of the popular cigarette ash test (F. H. Steiger, Text. Res. J. 28, 721, 1958). The latter consists of rubbing the object against another surface and then holding it over a shallow dish containing cigarette ash; the presence of static charge manifests itself by vigorous jumping of ash onto the charged surface.

The modification adopted here consisted of replacing cigarette ash with fireplace ash that had been stored under 15% relative humidity for at least 24 hours before using. The objects used were 4"×4" Plexiglas ® poly(methyl methacrylate) test plates of examples 1 through 5.

Static was generated by rubbing the test plates against daily newspapers that were also conditioned at 15% relative humidity for at least 24 hours before using. Fifteen medium pressure twelve-inch strokes were used for each sample. The samples were immediately held over the fireplace ash contained in a shallow dish.

Depending upon the quantity of ash picked up, the test plates were rated on a scale of 0 to 4, with 0 representing no static pickup of ash and 4 representing heavy pickup.

A similar test was conducted with screened and conditioned house dust collected from a home vacuum cleaner in place of fireplace ash to represent real life dust conditions. The propensity for dust pickup was again rated on a scale of 0 to 4.

Results

The results of static buildup in the Plexiglas ® poly(methyl methacrylate) test plates are shown in the following table.

| Sample # | Reaction Temp./Time[1] | Ash/Dust Pickup Tests (0 = no static, 4 = heavy static) Ratings: Ash/Dust |
|---|---|---|
| 1 | Control - No Treatment | 4/4 |
| 2 | Control - Washed With Water | 4/4 |
| 3 | Room Temp. (24° C.)/48 Hrs. | 4/4 |
| 4 | 80° C./6 Hrs. | 1/1 |
| 5 | 100° C./10 Hrs. | 0/0 |

[1]With diethanolamine in the presence of sodium methoxide catalyst.

As can be seen from the above table, the sample that was reacted at room temperature for 48 hours did not show any appreciable improvement over the controls, indicating that no or minimal reaction took place under these conditions. The sample that was reacted at 80° C. for 6 hours showed an appreciable improvement in static elimination, and that which was reacted at 100° C. showed a total elimination of static.

The antistatic performance exhibited by 4 and 5 was permanent since the samples were thoroughly washed with water before drying, conditioning, and static measurement.

Except for differences in ash/dust pickup behavior, the plates of examples 1 through 5 looked and behaved the same way.

I claim:

1. A process for permanently eliminating static from polyacrylate resin articles having the formula:

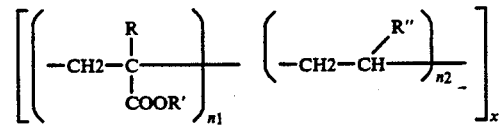

wherein R is either hydrogen or an alkyl group containing from 1 to 2 carbon atoms; R' is an alkyl group containing from 1 to 4 carbon atoms; R" is phenyl, cyano, or acetoxy group; $n_1+n_2=1$ wherein $n_1$ has a value ranging from about 0.2 to 1 and $n_2$ has a value ranging from 0 to 0.8; and where x is an integer ranging from about 100 to about 10,000,000, by reacting such articles on their surfaces with an excess of dialkanolamine having the formula:

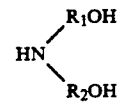

wherein $R_1OH$ and $R_2OH$ are alkanol groups containing from 1 to 4 carbon atoms.

2. The process of claim 1 where the reaction is conducted at temperatures in the range of from 70° C. to 180° C.

3. The process of claim 1 where the polyacrylate resin articles are poly(methyl methacrylate) resin articles and the dialkanolamine is diethanolamine.

4. The process of claim 3 where the reaction is conducted at temperatures in the range of from 80° to 105° C.

5. A process of claim 4 where the reaction is carried out in the presence of a basic catalyst.

6. A process of claim 5 where the basic catalyst is sodium methoxide.

* * * * *